United States Patent Office.

WALTER ERNEST ADENEY AND WILLIAM KAYE PARRY, OF DUBLIN, IRELAND.

PROCESS OF PURIFYING SEWAGE.

SPECIFICATION forming part of Letters Patent No. 589,460, dated September 7, 1897.

Application filed August 17, 1896. Serial No. 603,055. (No specimens.) Patented in England March 17, 1896, No. 5,955; in Belgium August 31, 1896, No. 123,287; in Cape Colony September 10, 1896, No. 1,223, and in New South Wales September 12, 1896, No. 6,890.

*To all whom it may concern:*

Be it known that we, WALTER ERNEST ADENEY, residing at 1 Eaton Place, Monkstown, and WILLIAM KAYE PARRY, residing at 6 Charlemont Terrace, Kingstown, Dublin, Ireland, subjects of the Queen of Great Britain, have invented a new and Improved Process for the Purification of Sewage, (for which we have obtained Letters Patent in Great Britain, No. 5,955, dated March 17, 1896; in Belgium, No. 123,287, dated August 31, 1896; in the Cape of Good Hope, No. 1,223, dated September 10, 1896, and in New South Wales, No. 6,890, dated September 12, 1896,) of which the following is a specification.

The object of our invention is to purify sewage cheaply and efficiently and to produce cheaply an efficient precipitant for sewage. Manganese compounds have heretofore been sometimes used for this purpose. They are very efficient, and but for the large cost heretofore of obtaining them might have been used to great advantage. We have discovered in a waste product which previous to our invention has not paid for the cost of removal a source from which manganese in a suitable form may be readily obtained—viz., the flue-dusts produced in certain manufacturing processes, especially iron, ferromanganese, and steel. By treating these special flue-dusts with acid bodies, such as sulfuric acid or hydrochloric acid, the manganese is obtained in a suitable form. The precipitant thus prepared consists mainly of chlorids or sulfates of manganese, magnesium, iron, and aluminium, together with some silica and manganese in the form of higher oxids ($Mn_3O_4$ $Mn_2O_3$). Several of these bodies act as precipitants; but the manganese is the most valuable, besides which the presence of the higher oxids of manganese in the resulting sewage-sludge prevents putrefaction therein, a matter of high technical and sanitary importance, since such sludges can be stored or otherwise handled previous to disposal as manures without danger of emitting offensive odors or of otherwise giving rise to unhealthy conditions.

In carrying out our invention we preferably proceed as follows: The flue-dusts are digested at a gentle heat with sulfuric acid or with hydrochloric acid in just sufficient quantity to extract completely and to convert into soluble sulfates or chlorids the chief basic substances therefrom—viz., manganese, magnesium, iron, and aluminium—and those also which may be present in smaller quantities—viz., nickel, cobalt, zinc, and calcium. By this treatment the said basic substances present are converted into sulfates or chlorids soluble in water, and when the treatment is complete the mass may be dried and applied to sewage or other waste liquors in the ways ordinarily employed for the precipitation of such liquids, or water may be added to the treated mass and the solution of sulfates or chlorids formed may be separated from the insoluble silica by filter-pressing or other suitable means and the solution obtained may be employed for mixing in suitable quantity with sewage or other waste liquids for the purpose of precipitation.

Besides treating the flue-dusts with sulfuric acid or with hydrochloric acid they may be fused with bisulfate of soda for the purpose of converting the hereinbefore-mentioned basic substances into sulfates soluble in water.

Among the advantages incident to our invention are the following:

First. The flue-dusts being in the form of very fine powders do not require crushing and powdering before treatment with acid.

Second. There is no waste of acid when the flue-dusts are being treated for conversion into precipitants, inasmuch as the flue-dusts contain little or no lime or any other substance which would cause waste.

Third. These flue-dusts are very easily attacked by either sulfuric or hydrochloric acid and require only a gentle heat to insure decomposition.

Fourth. These flue-dusts on treatment with acid give off no obnoxious gases or fumes.

Fifth. Precipitants prepared from these flue-dusts contain manganese or magnesium, or both together, in larger proportion than alumina. Inasmuch as alumina retards the completion of purification after clarification or precipitation of sewage and manganese and magnesium do not, but rather encourage it, precipitants prepared from flue-dusts are of high efficiency on scientific as well as on economic grounds.

We claim as our invention—

1. The process herein described for the precipitation of impurities from sewage or foul waters, which consists in treating flue-dusts produced in the manufacture of iron, ferromanganese and steel with acid bodies and then adding the precipitating agents thus produced to the sewage.

2. The process herein described, which consists in treating flue-dusts produced in the manufacture of iron, ferromanganese and steel with acid bodies to extract therefrom the chief basic substances and convert them into soluble salts, then separating them from the insoluble silica and then applying the precipitating agents to sewage for its purification.

WALTER ERNEST ADENEY.
WILLIAM KAYE PARRY.

Witnesses:
  W. HOPKINS,
  THOS. HAYES.